United States Patent [19]

Daggett

[11] Patent Number: 5,025,390

[45] Date of Patent: Jun. 18, 1991

[54] ROBOTIC WORKCELL CONTROL SYSTEM WITH A BINARY ACCELERATOR PROVIDING ENHANCED BINARY CALCULATIONS

[75] Inventor: Kenneth E. Daggett, Murrysville, Pa.

[73] Assignee: Staubli International AG, Switzerland

[21] Appl. No.: 304,971

[22] Filed: Jan. 31, 1989

[51] Int. Cl.⁵ .................. G06F 15/46; G06F 15/16
[52] U.S. Cl. .................. 364/513; 318/568.2; 364/900; 364/931.49
[58] Field of Search .............. 364/513, 191–193, 364/200 MS File, 900 MS File; 318/568.1, 568.11, 568.2, 568.21; 901/6, 2–5, 9, 41–43, 46

[56] References Cited

U.S. PATENT DOCUMENTS

| | | | |
|---|---|---|---|
| 4,467,436 | 8/1984 | Chance et al. | 364/513 |
| 4,586,151 | 4/1986 | Buote | 364/513 |
| 4,663,726 | 5/1987 | Chand et al. | 364/513 |
| 4,694,230 | 9/1987 | Slocum et al. | 364/513 X |
| 4,860,191 | 8/1989 | Nomura et al. | 364/200 |

Primary Examiner—Joseph Ruggiero

[57] ABSTRACT

A binary accelerator is provided for coprocessing operation with a microcontroller. A common memory is shared by the accelerator and the microcontroller for storage of binary equations and equation solutions. The accelerator is formed from a plurality of PAL and LS devices and execute fetched binary instructions in accordance with a Reverse Polish Notation (RPN) system.

5 Claims, 10 Drawing Sheets

ROBOTIC WORKCELL CONTROL SYSTEM WITH A BINARY ACCELERATOR PROVIDING ENHANCED BINARY CALCULATIONS

CROSS-REFERENCE TO RELATED PATENT APPLICATIONS

The following patent application is hereby incorporated by reference:

U.S. Ser. No. 932,975 abandoned and continued as Ser. No. 180,719 filed Apr. 4, 1988 entitled DIGITAL ROBOT CONTROL HAVING AN IMPROVED CURRENT SENSING SYSTEM FOR POWER AMPLIFIERS IN A DIGITAL ROBOT CONTROL and filed by Kenneth E. Daggett, Leonard C. Vercellotti, Richard A. Johnson, Richard J. Casler and Eimei Onaga now U.S. Pat. No. 4,902,944.

U.S. Ser. No. 932,841 abandoned and continued as Ser. No. 231,627 filed Aug. 5, 1988 entitled DIGITAL ROBOT CONTROL HAVING AN IMPROVED PULSE WIDTH MODULATOR and filed by Kenneth E. Daggett now U.S. Pat. No. 4,894,398.

U.S. Ser. No. 932,992 abandoned and continued as Ser. No. 180,703 entitled COMMUNICATION INTERFACE FOR MULTI-MICROPROCESSOR SERVO CONTROL IN A MULTI-AXIS ROBOT CONTROL SYSTEM and filed by Kenneth E. Daggett, now U.S. Pat. No. 4,868,472.

U.S. Ser. No. 932,976 entitled DIGITAL ROBOT CONTROL HAVING HIGH PERFORMANCE SERVO CONTROL SYSTEM and filed by Kenneth E. Daggett, Richard J. Casler and Eimei Onaga, now U.S. Pat. No. 4,763,055.

U.S. Ser. No. 932,974 abandoned and continued as Ser. No. 178,813 entitled DIGITAL ROBOT CONTROL PROVIDING PULSE WIDTH MODULATION FOR A BRUSHLESS DC DRIVE and filed by Kenneth E. Daggett, Richard A. Johnson, Eimei Onaga and Richard J. Casler, now U.S. Pat. No. 4,874,997.

U.S. Ser. No. 932,853 abandoned and continued as Ser. No. 178,811 entitled IMPROVED POSITION AND VELOCITY FEEDBACK SYSTEM FOR A DIGITAL ROBOT CONTROL and filed by Kenneth E. Daggett, Richard J. Casler and Eimei Onaga, now U.S. Pat. No. 4,876,494.

U.S. Ser. No. 932,982 abandoned and continued as Ser. No. 932,982 entitled UNIVERSAL ROBOT CONTROL BOARD CONFIGURATION and filed by Richard J. Casler, Eimei Onaga, Vincent P. Jalbert, Barrett Booth, and Kenneth E. Daggett.

U.S. Ser. No. 932,991 entitled BASIC DIGITAL MULTI-AXIS ROBOT CONTROL HAVING MODULAR PERFORMANCE EXPANSION CAPABILITY and filed by Kenneth E. Daggett, Barrett Booth, Eimei Onaga and Richard J. Casler, now U.S. Pat. No. 4,851,748.

U.S. Ser. No. 932,989 entitled IMPROVED DIGITAL CONTROL FOR MULTIAXIS ROBOTS and filed by Kenneth E. Daggett, Richard J. Casler, Eimei Onaga, Barrett Booth, Rajan Penkar, Leonard C. Vercellotti and Richard A. Johnson, now U.S. Pat. No. 4,786,847.

U.S. Ser. No. 932,983 entitled MODULAR ROBOT CONTROL SYSTEM and filed by Kenneth E. Daggett, Barrett Booth, Vincent P. Jalbert, Eimei Onaga and Richard J. Casler, now U.S. Pat. No. 4,908,556.

U.S. Ser. No. 304,975, filed on Jan. 31, 1989 entitled DIGITAL ROBOT CONTROL HAVING PULSE WIDTH MODULATOR OPERABLE WITH REDUCED NOISE K.E. Daggett, R. A. Johnson, L. C. Vercellotti, R. J. Casler, E. M. Onaga, L. L. Woodland.

U.S. Ser. No. 932,977, now Continuation Ser. No. 180,601 filed Apr. 6, 1988 entitled MULTIPROCESSOR TORQUE SERVO CONTROL FOR MULTIAXIS DIGITAL ROBOT CONTROL SYSTEM and filed by Kenneth E. Daggett, Richard J. Casler and Eimei Onaga, now U.S. Pat. No. 4,864,204.

U.S. Ser. No. 932,990, now Continuation Ser. No. 180,723 filed Apr. 4, 1988 entitled MULTIPROCESSOR POSITION/VELOCITY SERVO CONTROL FOR MULTIAXIS DIGITAL ROBOT CONTROL SYSTEM and filed by R. Lancraft, Eimei Onaga, Richard J. Casler, Kenneth E. Daggett and Barrett Booth, now U.S. Pat. No. 4,868,474.

U.S. Ser. No. 932,986 entitled MULTIAXIS ROBOT HAVING IMPROVED MOTION CONTROL THROUGH VARIABLE ACCELERATION/DECELERATION PROFILING and filed by Rajan Penkar, now U.S. Pat. No. 4,829,219.

U.S. Ser. No. 932,988 entitled MULTIAXIS ROBOT CONTROL HAVING CAPABILITY FOR EXECUTING TIMED MOVES and filed by Rajan Penkar, now U.S. Pat. No. 4,774,445.

U.S. Ser. No. 932,985 entitled MULTIAXIS ROBOT CONTROL HAVING IMPROVED CONTINUOUS PATH OPERATION and filed by Rajan Penkar, now U.S. Pat. No. 4,772,831.

U.S. Ser. No. 932,840 entitled MULTIAXIS ROBOT CONTROL HAVING FITTED CURVED PATH CONTROL and filed by Rajan Penkar, now U.S. Pat. No. 4,773,025.

U.S. Ser. No. 932,973, Continuation Ser. No. 180,598 filed Apr. 6, 1988 entitled MULTIAXIS ROBOT CONTROL HAVING IMPROVED ENERGY MONITORING SYSTEM FOR PROTECTING ROBOTS AGAINST JOINT MOTOR OVERLOAD and filed by Eimei Onaga, now U.S. Pat. No. 4,864,206.

U.S. Ser. No. 932,842 entitled MULTIAXIS DIGITAL ROBOT CONTROL HAVING A BACKUP VELOCITY MONITOR AND PROTECTION SYSTEM and filed by Eimei Onaga, now U.S. Pat. No. 4,807,153.

U.S. Ser. No. 304,972 entitled NETWORKABLE SMART I/O MODULE FOR ROBOTICS, filed concurrently herewith by E. M. Onaga, K. E. Daggett, R. J. Casler, J. A. Hart, and K. N. Trinh, on Jan. 31, 1989, and assigned to Westinghouse Electric Corporation, now U.S. Pat. No. 4,896,087.

BACKGROUND OF THE INVENTION

The present invention relates to robotic workcell control systems and more particularly to binary calculator systems employed therein to provide logic equation solutions for input/output control of the workcell process.

In the referenced patent application, there is disclosed an improved robotic workcell control system in which smart input/output modules provide distributed input/output control capability across the work cell. As a result, various advantages are realized including relieving the robot controller of the input/output control load, significantly reducing hardwiring requirements, and facilitating programming for the workcell operation.

The main duty of the input/output module is to provide solutions for binary logic equations which direct the sequential and other control of the workcell process. For this purpose, a binary calculator capability is required on the input/output module.

Available microprocessors such as the 8044 device have a binary instruction capability, but the time required for binary equation solution processing generally occupies too much of the total microcomputer duty cycle and specifically is too great to meet efficiently the solution speed requirements in typical robotic workcell applications of distributed input/output control.

It is therefore desirable that a faster binary calculator system be provided especially to achieve better robotic workcell operation with modular distribution of process input/output control.

SUMMARY OF THE INVENTION

A control system is provided for a robotic workcell in which various equipment items have control and sensor devices associated therewith. A controller for an electronic robot is disposed at one workcell location and an input/output control module is electronically linked to the controller and located at a second workcell location. Predetermined sensor inputs are connected to the module and the module has outputs connected to predetermined control devices.

A microprocessor is provided on the module to direct input/output control in accordance with a stored program. A coprocessor operates as a binary accelerator to provide rapid solutions for stored binary equations in accordance with a Reverse Polish Notation System. The coprocessor preferably includes PAL and LS devices organized to operate as described.

DESCRIPTION OF THE PREFERRED EMBODIMENT

ROBOTIC WORKCELL CONTROL SYSTEM

A workcell control system 70 (FIG. 3) includes the robot controllers 13C, 19C, and 23C to operate the robotic plant or workcell 10 in accordance with the invention. As shown, the electronic robot controller 13C operates the robot 13 in accordance with a user's program loaded into the controller 13C, for example through a floppy disk 72 under operator control from a programmer's console 71. The floppy disk 72 is also used advantageously to download programs to the input/output modules 75 as subsequently more fully described herein. A like operating scheme (not shown) is provided for each robot controller 19C or 23C.

Figure 3:
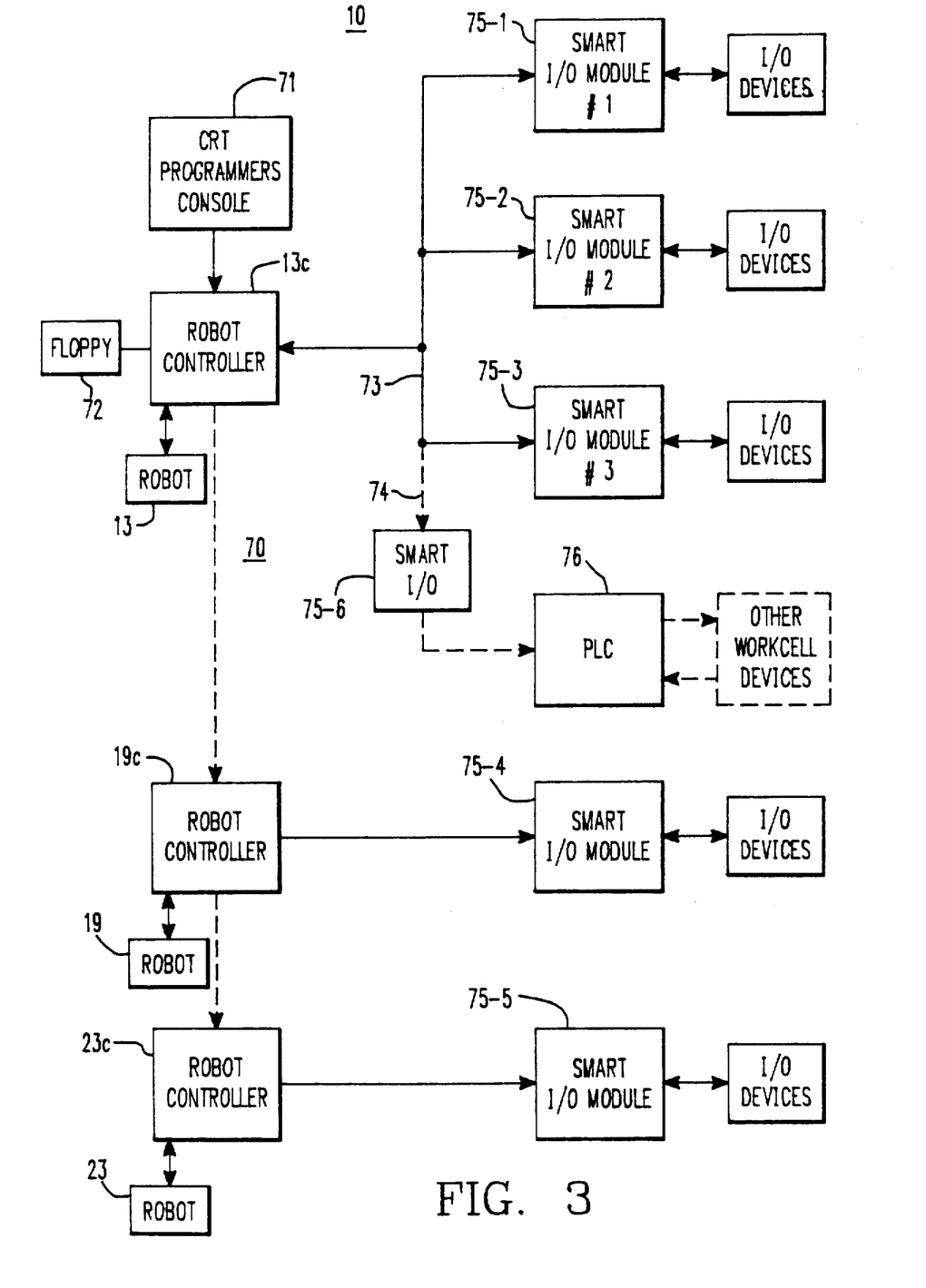
FIG. 3 shows a block diagram for a workcell control system in which robot controllers are arranged with input/output modules that provide distributed process input/output control and further include the binary accelerator of FIG. 1 in accordance with the invention.

The workcell control system 70 further includes a plurality of the input/output modules 75, with the number thereof depending on the input/output needs and the layout of the particular workcell being operated. As previously indicated, a total of 5 input/output modules 75-1 through 75-5 are employed in this case to provide a distributed intelligence interface with the input/output devices included in the workcell 10. Since the robot 13 is the only one having a plurality of input/output modules 75 in this application, only the robot controller 13C will be described to illustrate the invention.

A serial local area network bus 73 proVides data communications among and between the input/output modules 75-1 through 75-3 and the robot controller 13C. Accordingly, bus connections are employed for signalling across a large area of the plant 10 and only short wire runs are needed for individual input/output device connections. Substantial reduction in wiring is thus realized while freeing up control capacity and retaining centralized control in the robotic controller 13C.

As indicated by dotted line 74, one or more additional input/output modules 75-6 can be included in the system for connection to one or more respective conventional programmable logic controllers (PLCs) 76. In that event, other workcell input/output devices are wired to the PLC in the conventional manner.

INPUT/OUTPUT CONTROL MODULE

Figure 4:
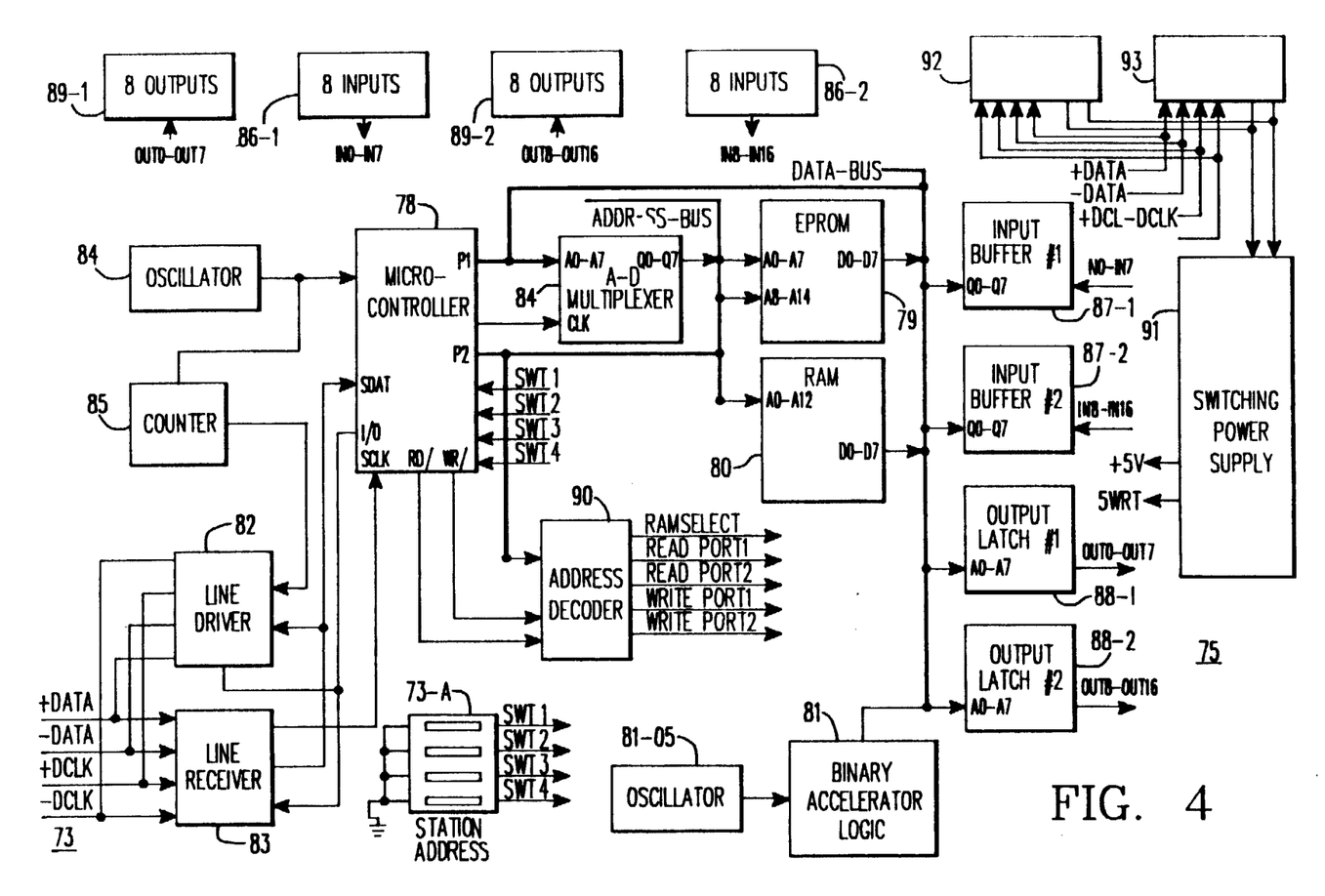
FIG. 4 shows circuitry for the smart input/output module of FIG. 3 in greater block detail.

The preferred electronic board circuitry for the input/output module 75 is represented by the block diagram shown in FIG. 4.

Local intelligence is provided for the module 75 by a microcontroller 78 (such as an INTEL 8044) and a coprocessing binary accelerator 81. The binary accelerator 81 provides solutions at hardware speed for logic equations assigned to it and thereby significantly speeds up the overall operation of the module 75.

The microcontroller 78 has 1) an EPROM memory 79 for storage of a downloaded module operation program and 2) a RAM memory 80 for storage of user programs related to sequence logic and other control of the input/output devices associated with the module.

The module operation program is downloaded from the robot controller 13 as previously indicated, and it executes its assigned level of control over data communications to and from the module 75 through the local area network 73 and further controls the execution of the user's programming which processes device inputs and generates device outputs that enable the particular module 75 to provide its assigned process control.

A line driver 82 and a line receiver 83 and a station address detector 73A operate as part of the data communication system. An oscillator 84 and a counter 85 provide a timer which in this case provides four different delay times that can be used to control output pulse length.

Device inputs are channeled from input terminal blocks 86-1 and 86-2 through buffers 87-1 and 87-2. Similarly, device outputs are applied to latch blocks 88-1 and 88-2 for output through terminal blocks 89-1 and 89-2. An address decoder 90 provides device selection for input/output operations.

Power is supplied to the board through block 91, 92, and 93.

PROGRAMMED OPERATION OF INPUT/OUTPUT MODULE

The program stored in the EPROM memory 79 is downloaded from the floppy disk through the robot controller 13 and specifically through its AIF board 800 (not shown) and through the line receiver 83 on the input/output module board 75. User programs that basically define the operation of the manufacturing process under control are similarly downloaded to the RAM memory 80. As a result, workcell operation is significantly facilitated especially since robot programming and input/output programming for process control can both be done with use of the same programming language and usually from the same work station.

Figures 5A, 5B:
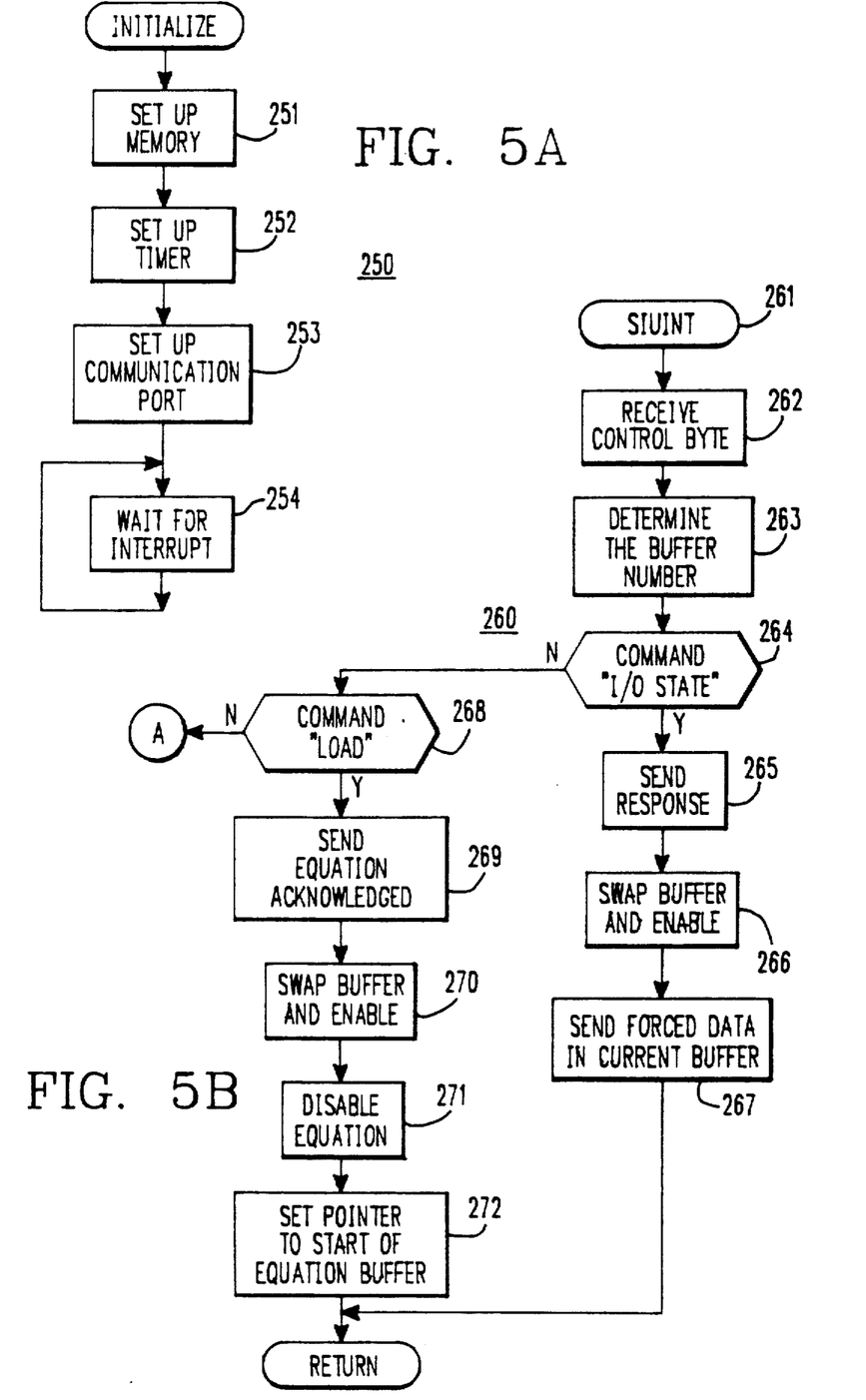
FIGS. 5A-5E show flow charts representing programming executed in a microprocessor that operates with the binary accelerator as a coprocessor on the input/output module of FIG. 4 in accordance with the invention.

As shown in FIG. 5A, an initialization routine 250 is executed after power-up. Blocks 251, 252 and 253 respectively operate the microcontroller or microprocessor 78 to set up the input/output board memory structure, the timer 85 and the communication port through the driver/receiver circuitry 82 and 83. Finally, block 254 places the microcontroller 78 in its interrupt mode, i.e. idling subject to interrupt control.

The microcontroller 78 is triggered into programmed operation by either of two basic interrupts. The first is a cyclic 4 millisecond interrupt from the timer 85 for status updating of the process inputs and outputs to and from the input/output module board. The second is a cyclic 32 millisecond interrupt from the serial communications line 73.

Figure 5C:
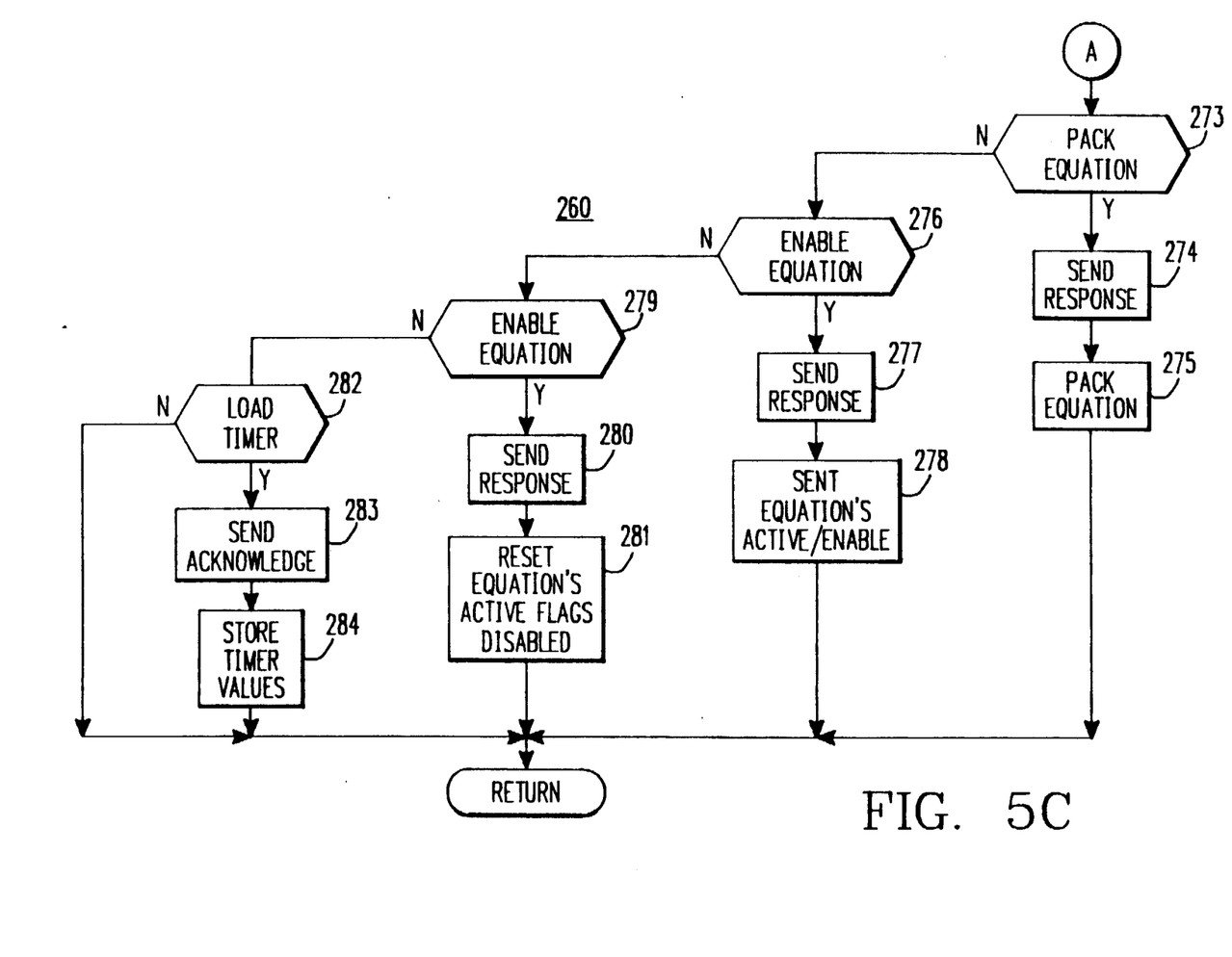

Programmed execution of board communications is illustrated by a flow chart 260 shown in FIGS. 5B and 5C. After an interrupt 261, blocks 262 and 263 receive the transmitted control byte and identify the destination buffer number.

If block 264 indicates the command is an I/O status request, an acknowledgement is sent by block 265 and buffer and enable data are swapped by block 266. Forced data in the current buffer is then sent to the output port by block 267 and the program returns to the interrupt idle mode.

When the command is determined by block 268 to be a user program load command rather than an I/O status request, provision is made for newly downloaded user equation data to be stored for execution by the binary accelerator 81. First, an acknowledgement is sent by block 269. Next, block 270 swaps buffer and enable data. Finally, the existing equation is disabled by block 271 and the equation buffer pointer is set by block 272 to the start of the new equation. The program then returns to the interrupt idling mode.

Other possible communicated commands are shown in FIG. 5C. For a pack equation command detected by block 273, block 274 sends an acknowledgement and block 275 executes equation packing and is followed by a return. If block 276 detects an enable equation command, block 278 enables or activates the identified and previously stored equation after block 277 sends an acknowledgement. Similarly, if block 279 detects a disable equation command, block 281 resets the active flag for the identified and previously stored equation thereby disabling it.

When a timer load command is detected by block 282, block 283 sends an acknowledgement and the new timer values are stored by block 284 for implementation in the input/output board operation.

Figures 5D, 5E:
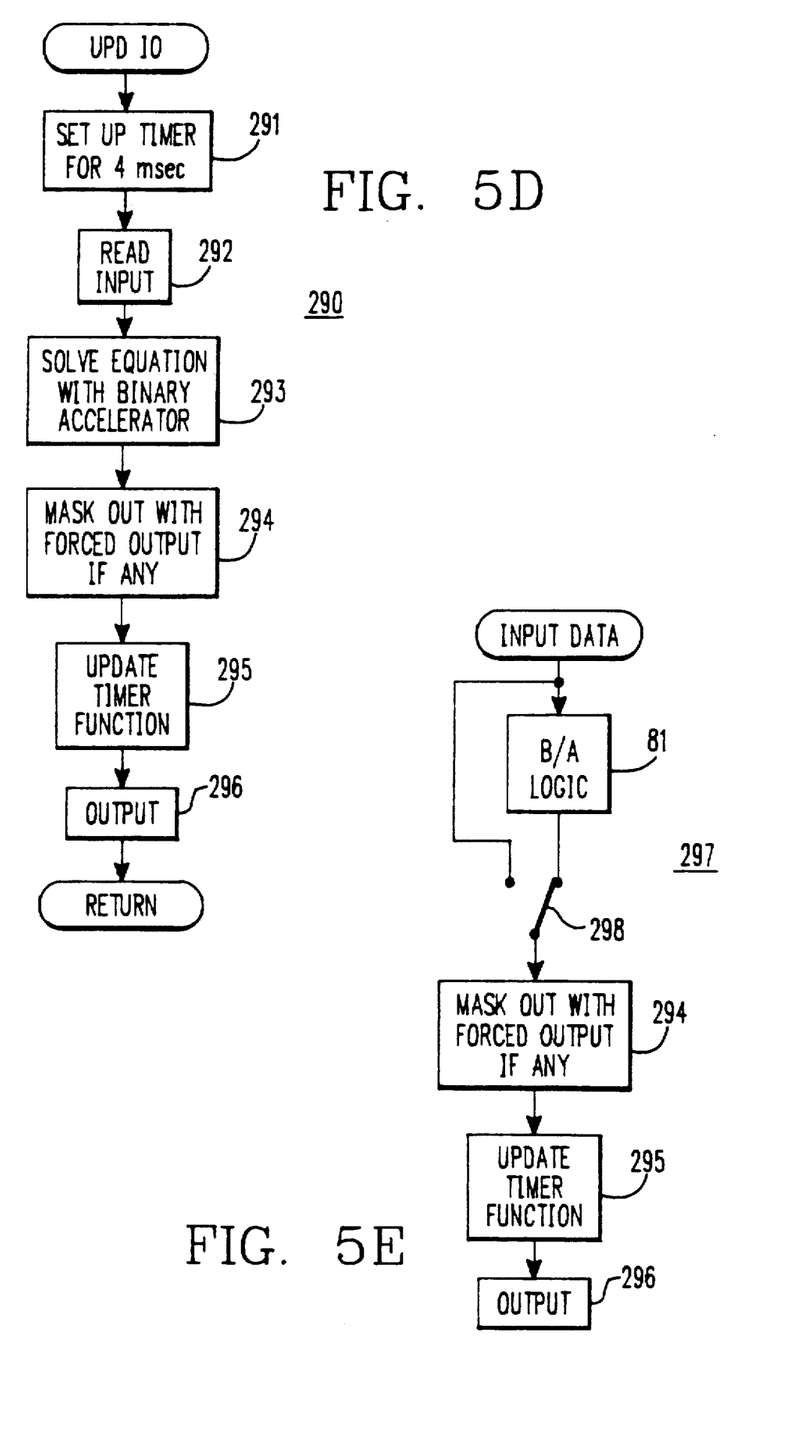

The process I/O status updating interrupt operation is represented by a flow chart 290 shown in FIG. 5D and a functional block diagram 297 shown in FIG. 5E. When a 4 millisecond timer interrupt occurs, block 291 first sets the timer for the next cycle and block 292 then reads the process input data. Block 293 then calls for the binary accelerator 81 to solve the active equation(s). The results are masked by block 294 with any forced output data that has been received as a higher level control command.

Next, the timer function is updated by block 295 and process outputs are generated by block 296. The schematic diagram shown in FIG. 5E shows how binary accelerator equations are either applied or not applied to process input data. Thus, an enable/disable switch 298 controls the application of binary accelerator logic 81 to input data according to the operation of program blocks 278 and 281. Blocks 294, 295 and 296 then operate as previously described.

BINARY ACCELERATOR

BINARY EQUATION CALCULATIONS

Generally, single chip microcontrollers such as the Intel 8051/8044, include instruction sets for performing binary operations and therefore have a capability for solving binary equations. However, complex binary equations, like those involved in the operation of the smart input/output module in the workcell control system, require extensive processing time. The use of microcontrollers in robotic workcell control and other real time applications, where binary equation solutions are required, is thus very restricted.

The present invention achieves better results in providing real time binary equation solutions through a coprocessing approach, i.e. through the use of the binary accelerator 81 as a coprocessor with the microcontroller 75. Normally, coprocessors are register oriented and thus represent a relatively complex approach to the solution of binary equations.

To achieve high operating speed without undue complexity, it is therefore preferred that the binary accelerator 81 be based on Reverse Polish Notation (RPN) operations.

Figure 1A:
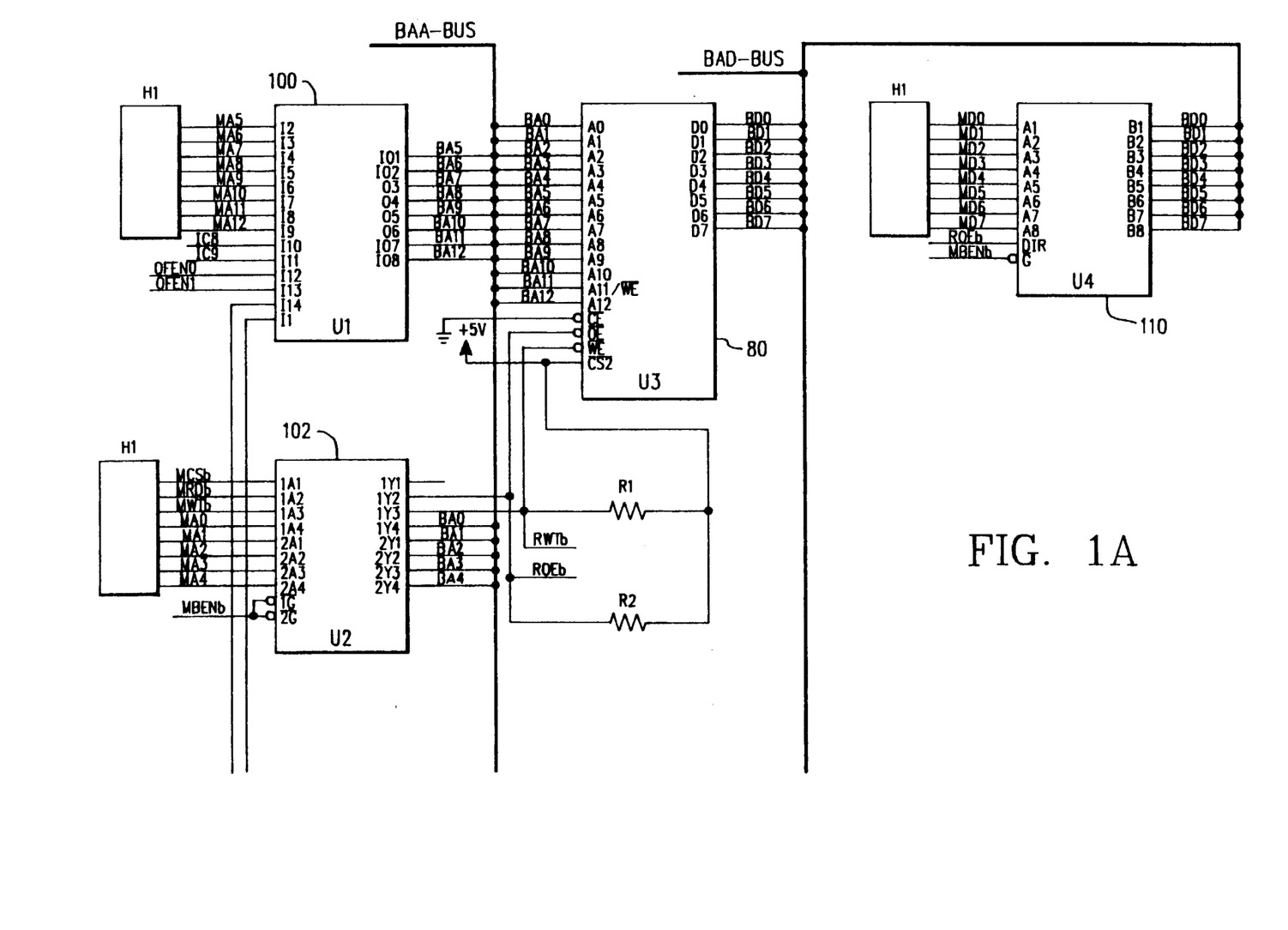
FIGS. 1A, 1B and 1C show a block diagram for binary accelerator circuitry arranged in accordance with the invention.
Figure 1B:
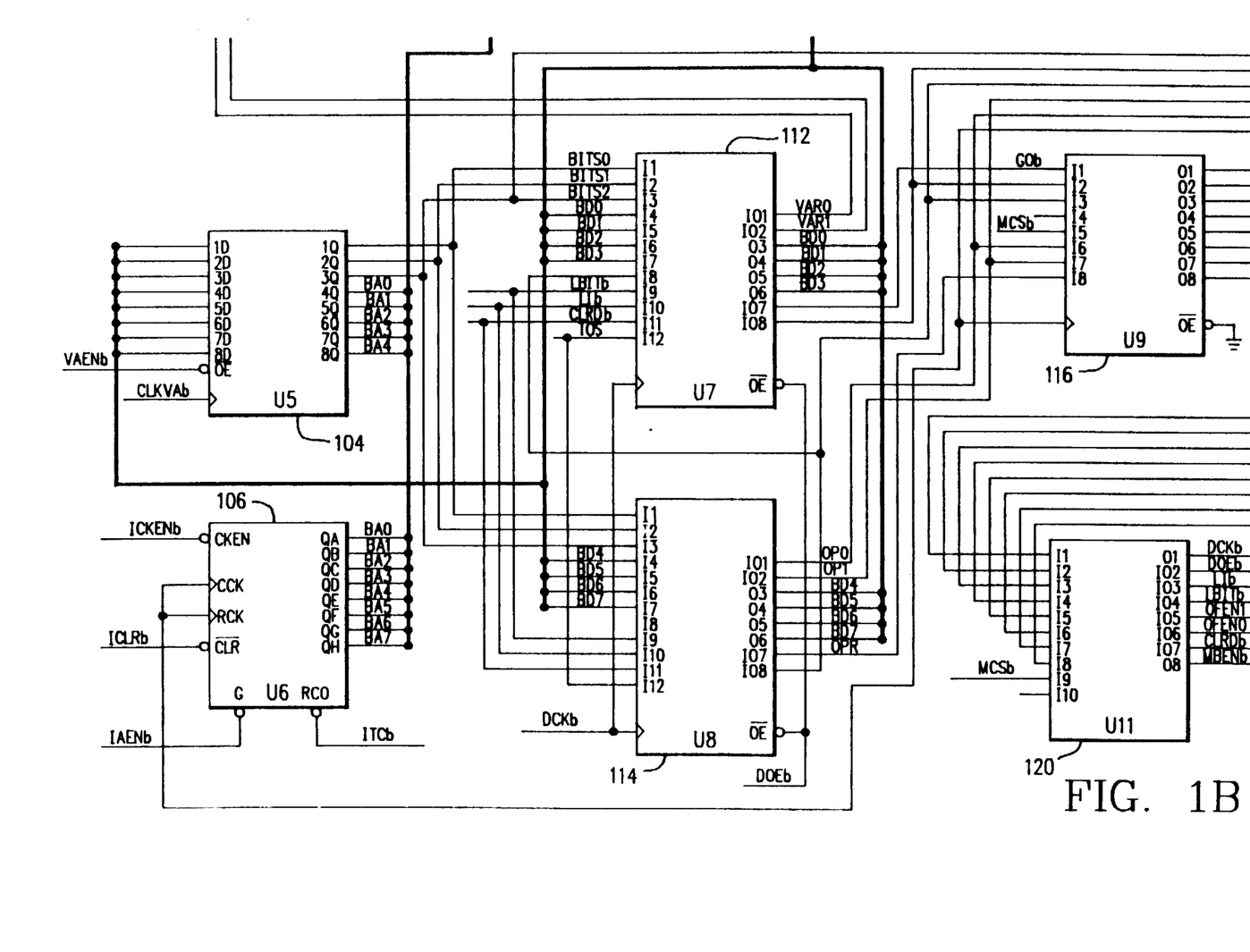
Figure 1C:
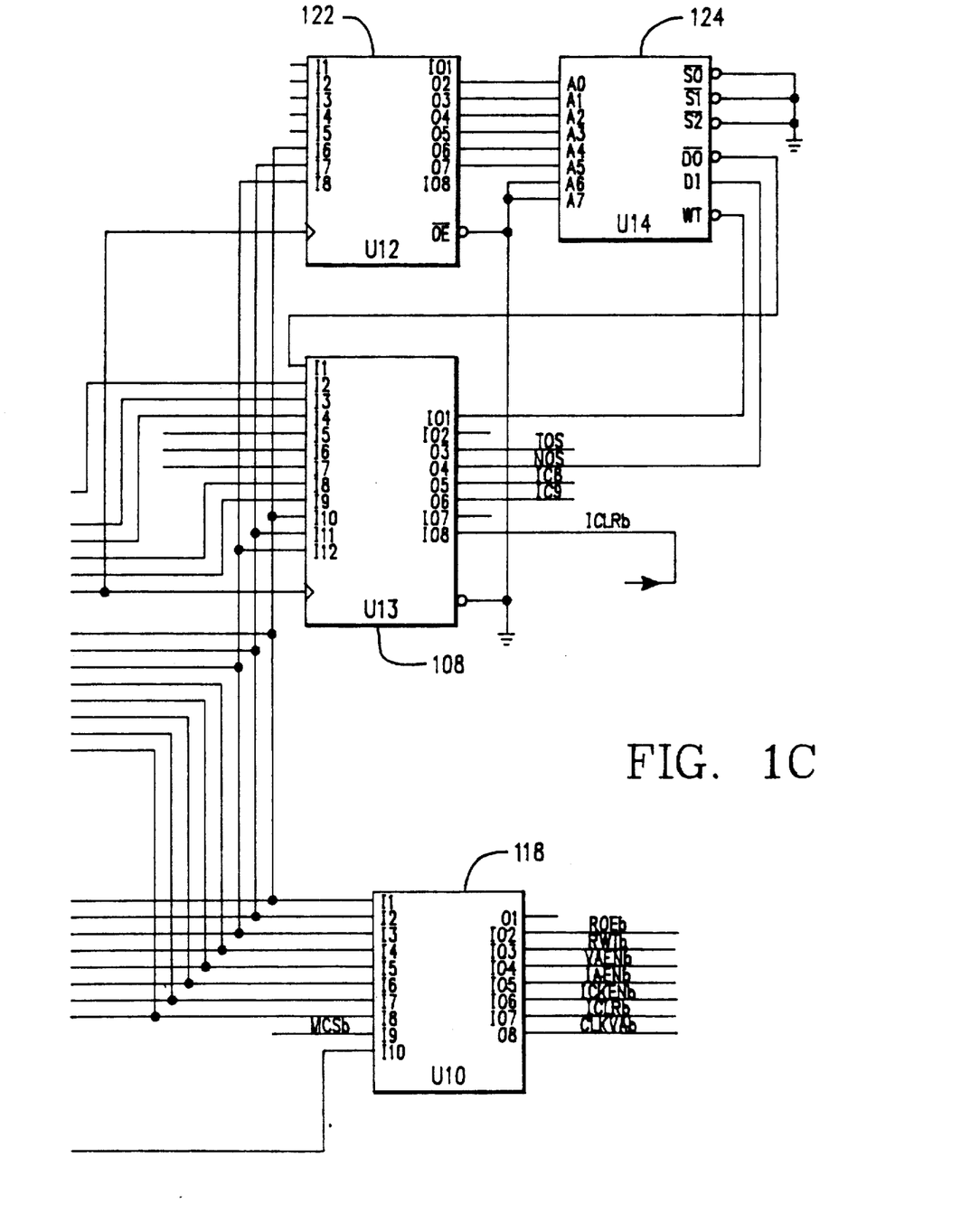

The circuitry employed to provide RPN operation for the binary accelerator 81 is shown in greater detail in FIG. 1. Generally, the binary accelerator 81 operates in conjunction with the random access, read-write memory 80 that is external to the microcontroller 75 and in this case is an 8K by 8 bit RAM.

A section of the RAM 80 is assigned to the binary accelerator 81. The binary accelerator memory section is further segmented into five regions as follows:
1. input point status
2. output point status
3. virtual point status
4. timer-enable status
5. storage of equations to be solved In the present embodiment, provision is made for 1024 bytes of equation storage and 256 points each for inputs, outputs, virtuals, and timer enables. A single location is also assigned for a START EQUATION SOLUTION command to the binary accelerator 81 and this same location is assigned for indication of an equation solution completion status from the binary accelerator 81.

An address map for the binary accelerator memory follows:

| BINARY ACCELERATOR MEMORY MAP | | | | | | | | | | | | | |
|---|---|---|---|---|---|---|---|---|---|---|---|---|---|
| RAM ADDRESS BITS | | | | | | | | | | | | | |
| 12 | 11 | 10 | 09 | 08 | 07 | 06 | 05 | 04 | 03 | 02 | 01 | 00 | FUNCTION |
| 1 | 1 | 1 | 1 | 1 | 1 | 0 | 0 | X | X | X | X | X | 1F80-1F9F INPUT |
| 1 | 1 | 1 | 1 | 1 | 1 | 0 | 1 | X | X | X | X | X | 1FA0-1FBF OUTPUT |
| 1 | 1 | 1 | 1 | 1 | 1 | 1 | 0 | X | X | X | X | X | 1FC0-1FDF VIRTUAL |
| 1 | 1 | 1 | 1 | 1 | 1 | 1 | 1 | X | X | X | X | X | 1FE0-1FFF TIMER |
| 1 | 1 | 0 | X | X | X | X | X | X | X | X | X | X | 1800-1BFF EQU. |
| 1 | 1 | 1 | 0 | 0 | 0 | 0 | 0 | 0 | 0 | 0 | 0 | 0 | 1C00 CMD/STATUS |

In operation, the microcontroller 75 writes the status of the variable information in the respective regions of binary accelerator memory, writes the equations to be solved, and sets the course and location to indicate that the binary accelerator is to start equation solution. Upon detection of the come and location being set, the binary accelerator 81 begins sequentially processing the equations. Equation solution is continued until a NO-OPERATION instruction is encountered, which indicates the end of the equation list. The binary accelerator 81 then clears the command location to indicate to the microcontroller 75 that the equation solution is completed. The microcontroller 75 has access to the RAM memory 80 during the time that the binary accelerator 81 is solving the instruction list. Thus, the microcontroller 75 can perform other operations concurrent with binary equation solution.

The RPN equation format involves usage of a stack location and two stack extension locations. The stack extension locations are referred to as Top-Of-Stack (TOS) and Next-On-Stack (NOS). Equations consist of a series of "push" variable operations, where a "push" results in the variable being placed in the TOS location, the previous contents of the TOS being placed in the NOS location, the previous contents of the NOS being placed in the first actual stack location, and the contents of this location being placed in the next immediate stack location, etc. All logical operations involve two variables and are performed using the contents of the TOS and the NOS locations. The result of the logical operation is placed in the TOS. Additionally, the contents on the first actual stack location is placed in the NOS, the contents of the next actual stack location is placed in the first actual stack location, etc. Thus, execution of logical operation results in a stack "pop". The stack consists of 64 locations, and operates in a last-in, first-out manner as described above.

The instruction set associated with the binary accelerator 81 consists of eight instructions as indicated in the following table. The instruction format consists of a single byte of data for all logical operations and PUSH and WRITE instructions require a second byte of data. The second byte defines the relative location of the variable to be operated upon.

| BINARY ACCELERATOR INSTRUCTION FORMAT | | | | | | | | |
|---|---|---|---|---|---|---|---|---|
| INSTRUCTION FIRST WORD | | | | | | | | |
| B7 | B6 | B5 | B4 | B3 | B2 | B1 | B0 | |
| | | | | | | | B0 = 1 → Input | |
| | | | | Variable | | B1 = 1 → Output | | |
| | | | | type field | | B2 = 1 → Virtual | | |
| | | | | | | B3 = 1 → Timer-enable | | |
| | | | B4 | Not Used | | | | |
| B7 | B6 | B5 | → | OPERATION; | | | | |
| 0 | 0 | 0 | → | NOP i.e. Done | | | | |
| 0 | 0 | 1 | → | PUSH Variable | | | | |
| 0 | 1 | 0 | → | WRITE Variable | | | | |
| 0 | 1 | 1 | → | PUSH Complement of Variable | | | | |

-continued

| BINARY ACCELERATOR INSTRUCTION FORMAT | | | | |
|---|---|---|---|---|
| 1 | 0 | 0 | → | TOS (AND) NOS → TOS |
| 1 | 0 | 1 | → | TOS (EOR) NOS → TOS |
| 1 | 1 | 0 | → | TOS (OR) NOS → TOS |
| 1 | 1 | 1 | → | Complement TOS → TOS |

As shown in FIG. 1, the binary accelerator 81 is formed from a plurality of programmed array logic (PAL) and LS electronic elements that operate with the RAM 80.

Both the microcontroller 75 and the binary accelerator 81 have access to the external RAM device 80. Devices 100, 102, 104, and 106 implement the memory address interface. PAL devices 100 and LS device 102 are strictly associated with the microcontrollers address interface. These devices permit direct mapping of the respective microcontrollers address bits onto the external RAM address bus. PAL and LS devices 100, 104, and 106 are associated with the binary accelerator address interface.

The binary accelerator 81 has three addressing related functions: one associated with operations on the Command/Status location; one associated with fetching equations; and one associated with operations on the variable locations. PAL device 100 is involved with all binary accelerator address related operations. Two control signals are used as inputs to PAL device 100 for definition of address related operation. These signals are labeled OFEN0 and OFEN1.

| OFEN1 | OFEN1 | FUNCTION |
|---|---|---|
| 1 | 1 | Microcontroller |
| 0 | 0 | Command/Status |
| 0 | 1 | Equations |
| 1 | 0 | Variable |

During Command/Status and equation fetch operations, PAL device 100 provides the upper five bits and LS device 106 provides the lower eight bits of the RAM address. During variable operations, PAL device 100 provides the upper eight bits and LS device 104 provides the lower five bits of the RAM address. For variable related operations, LS device 104 serves as an eight bit latch for storage of the variable address, and two signal lines are input to PAL device 100 for definition of the variable type. These two signals, VAR0 and VAR1, are used by the PAL 100 in determining the offset address associated with the variable type. LS device 106 serves as the lower eight bits of an address counter associated with fetching instructions. The upper two bits of the instruction address counter are implemented in PAL device 108.

LS device 110 provides for separation of the external RAM data bus from the microcontroller data bus. PAL devices 112 and 114 serve as the binary accelerator interface to the RAM 80. These devices store the binary accelerator instruction which is to be executed, encode the four bits of variable definition, and provide for multiplexing of the data bus necessary to permit bit write operations on the RAM.

Figure 2A:
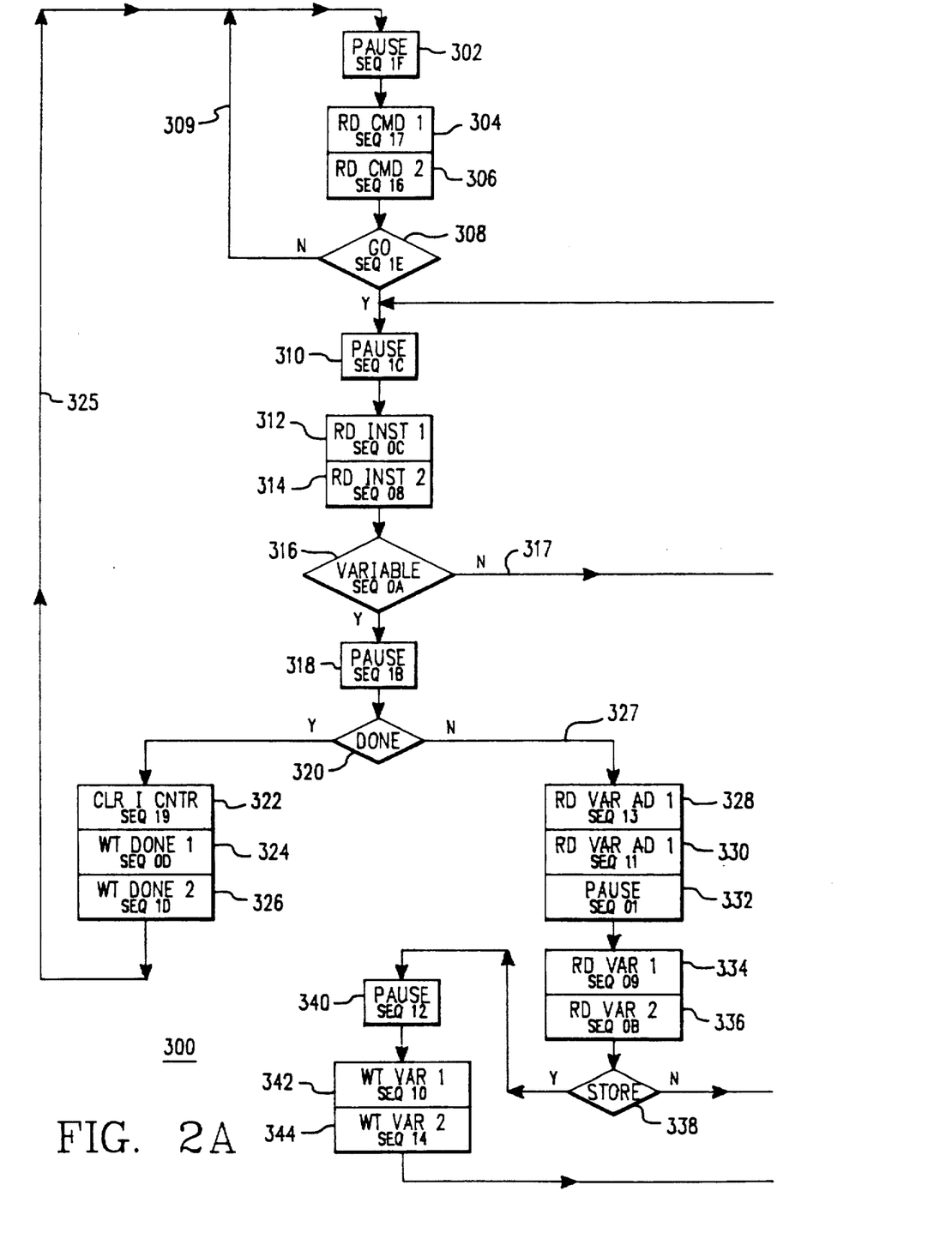
FIGS. 2A and 2B show a flow chart diagram for the sequential operation of the binary accelerator of FIG. 1.
Figure 2B:
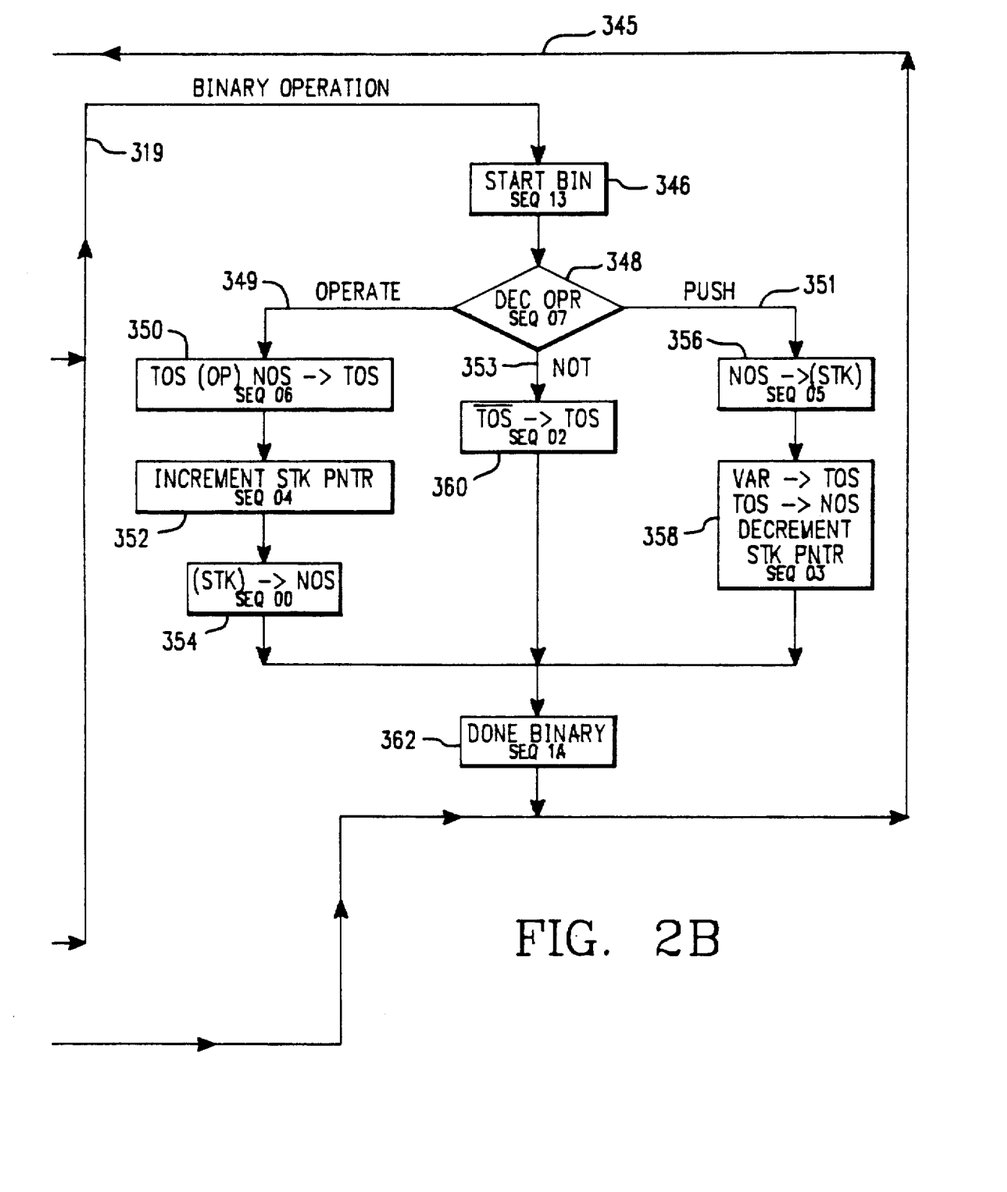

PAL device 116 provides the state sequencer associated with binary accelerator operations. A sequential flow diagram 300 of the logic implemented with the PAL 116 is shown in FIG. 2. PAL devices 118 and 120 provide for generation of the control signals necessary for controlling the external RAM address and data bus interface devices.

PAL and LS devices 122, 108, and 124 implement the stack and logical execution unit of the binary accelerator 81. LS device 124 is a 64-word by one-bit memory device and serves as the RPN stack into which 64 variables can be pushed. PAL device 122 implements the six-bit up/down counter which serves as the stack pointer. PAL device 108 serves as the logical execution unit that includes the TOS and NOS bit storage locations and the logic necessary for performing the equation solution.

The sequencer flow diagram includes states which are labeled as PAUSE. These states are necessary for determination of microcontroller request for access to the external RAM. If the microcontroller is requesting access, the sequencer remains in the PAUSE state until the microcontroller is no longer requesting access to the external RAM. The PAUSE states are inserted in the binary accelerator often enough to ensure that the microcontroller access timing requirements are satisfied.

As already indicated, the sequencer flow chart 300 in FIG. 2 provides greater detail on the state sequencing of the binary accelerator. Generally, the sequencer 300 acts in accordance with the total set of equation instructions stored in the memory shared with the microcontroller. As the instructions are executed sequentially, successive binary equations are solved and final results are written to memory for later use.

When the sequencer 300 is first entered, block 302 executes a PAUSE to determine whether the microcontroller requires access to the shared memory. If not, blocks 304 and 306 read the command status. If there is no new command, block 308 causes the sequencer 300 to loop continuously through path 309 until an operation GO command is read.

Once a binary operation command is read, block 310 creates another PAUSE and blocks 312 and 314 then read the sequencer instruction which will be one of seven possible instructions. A two step memory read procedure is needed in this case because of timing requirements.

Block 316 next tests the instruction to determine whether a variable is required. If not, path 317 is followed directly to a binary operation path 319. If so, block 318 next creates another PAUSE and block 320 determines during the pause that the operation is not yet done and path 327 is followed to fetch the variable data before entering the binary operation path 319.

In the variable data fetch, blocks 328 and 330 determine the variable address in a two step process. Block 332 creates another PAUSE and blocks 334 and 336 next read the variable.

If no store is requested as detected by block 338, the binary operation path 319 is entered. When a store operation is requested, in this case only for a right variable location instruction, block 340 creates a PAUSE and blocks 342 and 344 write the variable from the TOS (top-of-stack) to memory, and the sequencer then cycles back over instruction completed path 345 to PAUSE block 310 for execution of the next instruction.

Block 346 starts a binary instruction execution and block 348 decodes the binary instruction or operation, i.e. PUSH, OPERATE or NOT. For a PUSH, block 356 moves data from NOS (next-on-stack) to STACK and box 358 moves fetched variable date (BL 334, 336) to TOS, the TOS contents to next on stack (NOS) and decrements the stack pointer. Block 362 next detects that the push instruction execution is done and the sequencer returns for the next instruction over the path 345 to the block 310.

If the instruction to be executed is an inversion, path 353 is followed to box 360 where the content of TOS is negated and box 362 then returns the sequencer to the block 310 for the next instruction.

When an operate instruction is to be executed, path 349 is followed from decode block 348 to block 350 where an AND or OR operation is executed on the TOS contents and the NOS content is moved to the TOS. Block 352 increments the stack pointer and block 354 POPS the stack content to the NOS. The instruction done block 362 returns the sequencer to block 310 for the next instruction.

When the DONE block 320 detects that the binary instruction set (i.e. the total solution) has been completed, i.e. a condition of NO OPERATION, block 322 clears the instruction counter and blocks 324 and 326. The sequencer then returns over path 325 to the command status loop 309 for the next binary instruction set.

What is claimed is:

1. A control system for a robotic workcell having at least one electric robot and a plurality of workcell equipment items in turn having a plurality of control and sensor devices associated therewith, said system comprising:

an electronic robot controller disposed at a first workcell location to operate said robot as a part of the workcell process;

means for loading program data into said robot controller;

at least one input/output control module disposed at a second workcell location and having connected thereto as inputs a first group of sensor devices and as outputs a first group of said control devices; and means for linking said robot controller and said input/output module to provide for program and process data communication;

said input/output module having computing means including a microprocessor for operating the module in accordance with a system operating program downloadable from said robot controller to said module and for processing inputs and outputs in accordance with a user process program downloadable from said robot controller to the module;

said input/output module further having coprocessor means for executing binary equation solutions and storing the results thereof for processing by said microprocessor and thereby accelerating the solution of said binary equations; wherein said coprocessor means includes circuit means for fetching binary instructions from memory and for sequentially executing the binary instructions to produce binary equation solutions in accordance with a reverse polish notation calculation system.

2. A control system as set forth in claim 1 wherein said coprocessor circuit means includes a plurality of PAL and LS devices organized to provide a memory address interface, storage means for binary instructions to be executed, a coprocessor state sequencer, and RPN stack and execution circuitry.

3. A control system as set forth in claim 2 wherein said PAL and LS devices include an LS device for a RPN stack, a PAL device operating as an up/down counter that serves as the stack pointer, and a PAL device serving as a logic execution unit having Top-of-Stack and Next-on-Stack bit storage locations and stored logic used in performing binary equation solutions.

4. A control system as set forth in claim 2 wherein said coprocessor state sequencer is a PAL device arranged to operate said coprocessor means to detect in sequence when a binary operation command has been generated by said microprocessor to fetch binary instructions for execution, to fetch any variable needed to execute binary instructions, to decode the type of binary operation required by each instruction, to execute the decoded binary instruction, to return for a new binary instruction and to clear the sequencer for a new operation when instruction execution is done.

5. A control system as set forth in claim 4 wherein said PAL and LS devices include an LS device for a RPN stack, a PAL device operating as an up/down counter that serves as the stack pointer, and a PAL device serving as a logic execution unit having Top-of-Stack and Next-on-Stack bit storage locations and stored logic used in performing binary equation solutions.

* * * * *

UNITED STATES PATENT AND TRADEMARK OFFICE
CERTIFICATE OF CORRECTION

PATENT NO. : 5,025,390
DATED : June 18, 1991
INVENTOR(S) : Kenneth E. Daggett

It is certified that error appears in the above-identified patent and that said Letters Patent is hereby corrected as shown below:

Column 7, line 15, "course and" should read --command--.

Column 7, line 17, "come and" should read --command--.

Signed and Sealed this

Tenth Day of November, 1992

Attest:

DOUGLAS B. COMER

*Attesting Officer*     *Acting Commissioner of Patents and Trademarks*